USOO6866233B2

(12) United States Patent
Patel et al.

(10) Patent No.: US 6,866,233 B2
(45) Date of Patent: Mar. 15, 2005

(54) RECONFIGURABLE POROUS TECHNOLOGY FOR FLUID FLOW CONTROL AND METHOD OF CONTROLLING FLOW

(75) Inventors: Mehul P. Patel, Streetsboro, OH (US); Jack M DiCocco, Broadview Heights, OH (US); Troy Prince, Cleveland, OH (US)

(73) Assignee: Orbital Research Inc., Cleveland, OH (US)

( * ) Notice: Subject to any disclaimer, the term of this patent is extended or adjusted under 35 U.S.C. 154(b) by 4 days.

(21) Appl. No.: 10/336,113

(22) Filed: Jan. 3, 2003

(65) Prior Publication Data

US 2004/0129839 A1 Jul. 8, 2004

(51) Int. Cl.[7] .............................................. B64C 21/02
(52) U.S. Cl. ...................... 244/204; 244/209; 244/210
(58) Field of Search ............................... 244/204–205, 244/207–210; 251/61.1

(56) References Cited

U.S. PATENT DOCUMENTS

| 3,951,360 | A | * | 4/1976 | Anxionnaz | 244/209 |
| 4,392,621 | A | * | 7/1983 | Viets | 244/12.5 |
| 4,522,360 | A | * | 6/1985 | Barnwell et al. | 244/204 |
| 4,664,345 | A | * | 5/1987 | Lurz | 244/209 |
| 4,989,810 | A | * | 2/1991 | Meier et al. | 244/208 |
| 5,316,032 | A | * | 5/1994 | DeCoux | 244/207 |
| 5,335,885 | A | * | 8/1994 | Bohning | 244/204 |
| 5,806,808 | A | | 9/1998 | O'Neil | 244/213 |
| 6,079,671 | A | | 6/2000 | O'Neil et al. | 244/204 |
| 6,302,360 | B1 | * | 10/2001 | Ng | 244/203 |
| 6,408,878 | B2 | * | 6/2002 | Unger et al. | 251/61.1 |

OTHER PUBLICATIONS

Roger Kimmel, Paul Orkwis, and Elizabeth Lurie; Fluid Dynamics; Aerospace America, Dec. 2000, pp 20–21.
Mehul Patel, Gerard Skebe, Frederick Lisy, and Terry Ng; Development of a MEMS Based Microvalve for Flow Control Using Active Dimples; 40th Aerospace Sciences Meeting & Exhibit, 14–17 Jan. 2002/Reno, NV; pp 1–10.

* cited by examiner

*Primary Examiner*—Galen Barefoot
(74) *Attorney, Agent, or Firm*—Brian M. Kolkowski

(57) ABSTRACT

The present invention relates to a reconfigurable porous technology for fluid flow control system and more particularly to reconfigurable porosity fluid flow control system for vehicles such as aircraft, missiles, ground and water vehicles to improve the performance of such vehicles. The present invention further relates to a method of operating the reconfigurable fluid flow control system.

In one embodiment, the present invention includes a reconfigurable porosity system for fluid flow control on the surface of an aircraft, missile, water-craft or ground vehicle comprising a porous outer skin comprising individual pores; individually addressable valves corresponding and connected to the individual pores for opening and closing the pores; and a pneumatic system for connecting the pores wherein fluid from a high pressure area of the porous outer skin can be directed to a low pressure area of the porous outer skin by opening and closing the individually addressable valves. In another embodiment, the present invention includes a method of fluid flow control using reconfigurable porosity.

19 Claims, 4 Drawing Sheets

RECONFIGURABLE POROUS TECHNOLOGY FOR FLUID FLOW CONTROL AND METHOD OF CONTROLLING FLOW

The U.S. Government has a paid-up license in this invention and the right in limited circumstances to require the patent owner to license others on reasonable terms provided for by the terms of grant DAAE30-02-C-1052 awarded by Department of Defense, U.S. Army.

BACKGROUND OF THE INVENTION

1. Field of the Invention

The present invention relates to a reconfigurable porous technology for fluid flow control system and more particularly to reconfigurable porosity fluid flow control system for vehicles such as aircraft, missiles, ground and water vehicles to improve the performance of such vehicles. The present invention further relates to a method of operating the reconfigurable porosity fluid flow control system.

2. Technical Background

Conventionally, technology to control lift or drag on vehicles such as aircraft, missiles, ground vehicles and water vehicles utilizes various movable mechanical structures. These structures include fins, spoilers, canards and associated structural and actuation hardware to alter, vary and control lift or drag. These control structures have required significant payload and volume in order to house both the control structure and associated hardware imposing substantial weight, volume, and power requirements, thereby reducing the performance of the vehicle.

An example of this has been where conventional control surfaces reduced the effective payload volume of a missile that could be potentially used for other systems such as an inertial measurement unit; a global positioning system; and/or additional rockets, explosives and/or other payload. The additional weight and drag of these control surfaces also reduced the range and efficiency of the missile. Furthermore, canards and fins create significant drag, pushing the missile weapons designer into a Faustian bargain, i.e., trading maneuverability and accuracy for range and payload capacity. Similar problems exist with the use of conventional control surfaces on other types of vehicles.

Additionally, conventional control surfaces which utilize hydraulic, pneumatic, and other mechanical devices have been subject to various static and dynamic forces, loads, pressures, stresses, strain, wear and fatigue which result in reducing the life and accelerated failure of these various components. These various static and dynamic forces, loads, pressures, stresses, strain, wear and fatigue may have been also transferred or otherwise transmitted to portions of the vehicle structure resulting in a reduction in the useful life of the vehicle structure itself.

More recently, vehicle designers have overcome some of these limitations with the use of porosity to control the transfer of fluid flow through one or more surfaces on various regions of a vehicle. Generally with these porous systems, the designers have used a static system where the pores or openings, and the pneumatic substructure connecting the pores or openings does not change due to dynamic conditions on the vehicle surface. Even more recently, aircraft airfoil designers have proposed airfoil systems, which allow for a somewhat limited control of the fluid flow by the use of changeable configurations of pores or openings, or of the underlying pneumatic substructure. These systems, however, have been limited from effectively operating in the changing conditions of a rapidly evolving, dynamic environment most vehicles experience during normal operations. This is because the passive porous systems do not change in response to the highly evolving surface conditions, and the porous systems with changeable configurations are reconfigured too slowly and without the resolution (due to the small number of configurations which are achievable with these systems) needed for the fluid flow dynamics of most vehicles' surfaces.

Accordingly, it is the object of this invention to provide a reconfigurable porosity system in which the pores on the surface are individually addressable, and highly reconfigurable.

Another object of the present invention is to provide a reconfigurable porosity system in which the pores are reconfigurable in real time.

Still another object of the present invention is a method for operating such a reconfigurable porosity fluid flow control system.

SUMMARY OF THE INVENTION

The present invention relates to a reconfigurable porosity fluid flow control system and more particularly to reconfigurable fluid flow control system for vehicles such as aircraft, missiles, ground and water vehicles to improve the performance of such vehicles. The present invention further relates to a method of operating the reconfigurable fluid flow control system.

In one embodiment, the present invention includes a reconfigurable porosity system for fluid flow control on the surface of an aircraft, missile, water-craft or ground vehicle comprising a porous outer skin comprising individual pores; individually addressable valves corresponding and connected to the individual pores for opening and closing the pores; and a pneumatic system for connecting the pores wherein fluid from a high pressure area of the porous outer skin can be directed to a low pressure area of the porous outer skin by opening and closing the individually addressable valves.

In another embodiment, the present invention includes a method for fluid flow control on the surface of an aircraft, missile, water-craft or ground vehicle comprising measuring an output of a sensor to determine conditions which result in high and low pressure areas on a porous surface comprising individual pores over which a fluid is passing; estimating or determining the high and low pressure areas of the porous surface comprising individual pores based in part on the sensor output; and opening and/or closing valves corresponding and connected to the individual pores to allow movement of the fluid from at least one of the higher pressure areas to at least one of the lower pressure areas of the porous surface through a pneumatic system connecting the pores.

In still another embodiment, the present invention includes a reconfigurable porosity system for fluid flow control on the surface of an aircraft, missile, water-craft or ground vehicle comprising a porous outer skin comprising individual pores; at least one micro mechanical valve; and a pneumatic system for connecting the pores and valve wherein fluid from a high pressure area of the porous outer skin can be directed to a low pressure area of the porous outer skin by opening and closing the micro mechanical valve.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENTS

The present invention relates to a reconfigurable porosity fluid flow control system and more particularly to reconfigurable fluid flow control system for vehicles such as aircraft, missiles, ground and water vehicles to improve the performance of such vehicles. The present invention further relates to a method of operating the reconfigurable porosity fluid flow control system.

Figure 1:
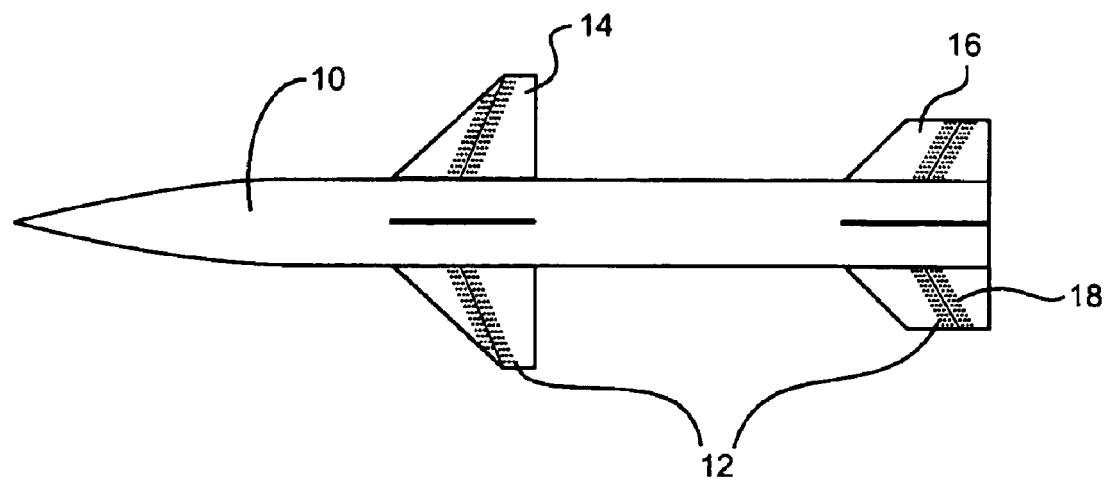
FIG. 1. Schematic view of one embodiment of a missile utilizing a reconfigurable porosity system in its control wings and fins.

Referring now to FIG. 1, there is shown a schematic view of one embodiment of a missile 10 utilizing a reconfigurable porosity system 12 within its control wings 14 and control fins 16. The reconfigurable porosity system 12 comprising a porous skin further comprising a number of individual pores 18. The pores 18 capable of being opened and closed to the passage of fluid there through by individually addressable valves (not shown) corresponding and connected to the individual pores. The reconfigurable porosity system 12 of the present invention being used to direct fluid from high pressure areas of the porous outer skin to low pressure areas of the porous outer skin by opening and closing the individually addressable valves (not shown).

Figure 2:
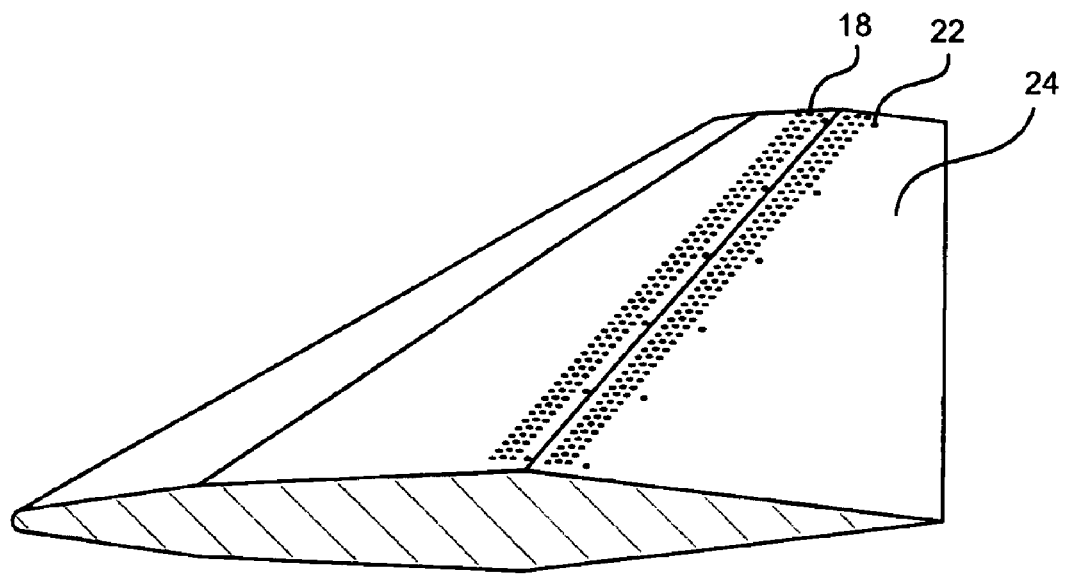
FIG. 2. Perspective view of one embodiment of a missile wing or fin showing reconfigurable pores and surface mounted sensors.

The various embodiments of the present invention may further comprise a sensor having an output, the output being used at least in part to estimate or determine the high and low pressure areas of the porous outer skin, and a closed loop control system for opening and closing the individually addressable valves based on at least in part the output of the sensor. FIG. 2 is a perspective view of one embodiment of a missile wing or fin showing reconfigurable pores 18 and surface mounted sensors 22. The sensor(s) 22 of various embodiments of the present invention include but are not limited to dynamic pressure sensors, wall shear stress sensors, shear stress sensor (hot film anemometer, a direct measurement floating-element shear stress sensor), inertial measurement unit or system, and other sensors know to those skilled in the art whose signal could be used to estimate or determine flow separation or pressure differences over the surface of a vehicle. The sensors of the present invention are used to determine or estimate flow separation or pressure variations over the surfaces of a vehicle. An inertial measurement unit for example is a sensor, which would not directly measure flow separation, but could be used to estimate or predict separation. The preferred sensor 22 of the present invention is a pressure sensor 22. The pressure sensor 22 is used to sense variations in pressure over the vehicle surface 24 in the vicinity of the pressure sensor 22, and hence flow separation. The pressure sensor 22 can for example be a piezoelectric device, which generates an electric signal in response to a sensed pressure, a shape memory alloy device, or any other pressure sensor or transducer known to those skilled in the art. Preferably, the ratio of pores 18 to sensors 22 is less than about 100:1, more preferably less than or equal to 50:1, and most preferably less than or equal to 20:1. The higher the concentration of pressure sensors to flow effectors the more redundancy can be built into the system utilizing the present invention. Most preferably the sensor is a flush, surface mounted diaphragm type pressure sensor. The sensor 22 or multiple sensors having a signal which is used at least in part by a controller (not shown) to activate and deactivate the individually addressable valves or micro valves.

Figure 3:
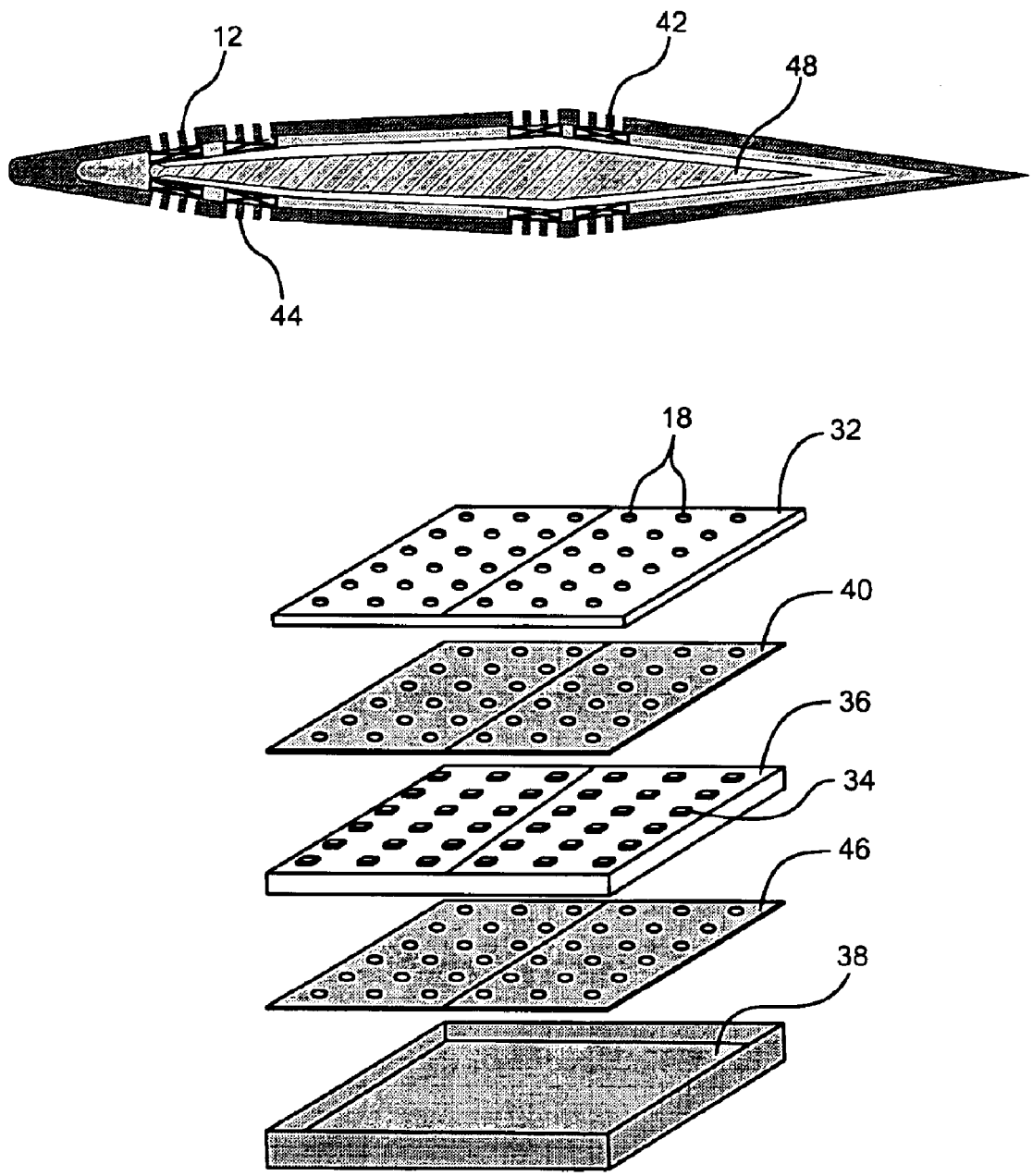
FIG. 3. Exploded view of the missile wing or fin showing the skin with surface mounted sensors, a packaged integrated valve layer, a common plenum for each surface and the substructure.

FIG. 3 is an exploded view of one embodiment of an aircraft wing, or a missile wing or fin showing the porous skin 32; a packaged, integrated valve layer 36; and a common plenum 38 for each surface of the aircraft or missile wing or fin. The porous skin 32 having individual pores 18 and surface mounted sensors 22. The individually addressable valves 34 being integrated and packaged to form a sub-layer (packaged, integrated valve layer 36) of the overall wing or fin structure. The porous skin 32 being sealed to the packaged, integrated valve layer 36 to prevent leakage or diversion of the fluid flow. One method of sealing the porous skin to the packaged, integrated valve layer 36 is through the use of a sheet gasket 40 made preferably from an elastomeric material as shown with openings between each of the pores 18 and the corresponding valves 34. The individual pores 18 are connected by a pneumatic system 38, which in this particular embodiment is a common plenum 38. The pneumatic system 38 may consist of a common plenum, a series of plenums, which are capable of being interconnected and controlled, or a number of pneumatic pathways, which can be controlled and connected by a variety of methods known to those skilled in the art. In this particular embodiment, the two plenums 38 may be connected to allow for fluid flow between the top 42 and bottom 44 surfaces of the wing or fin. The pneumatic system 38 is connected to each of the individual valves 34. The individual valves can be connected to the pneumatic system 34 by methods know to those skilled in the art including but not limited to welding, fittings, adhesives, and combinations thereof. In this particular embodiment, the packaged, integrated valve layer 36 is sealed to the plenum 38 by the use of another sheet gasket 46 and either compressing the valve layer 36 to the plenum 38, or adhesively sealing them together. The entire reconfigurable porosity system 12 is connected to the wing or fin substructure 48 by methods known to those skilled in the art including but not limited to welding, fittings, riveting, adhesives and combinations thereof. The individual valves 34 of the packaged, integrated valve layer 36 are integrated to one or more electrical circuits and packaged to withstand the most severe conditions the wings or fins will be required to sustain for their particular applications by methods known to those skilled in the art.

Figure 4:
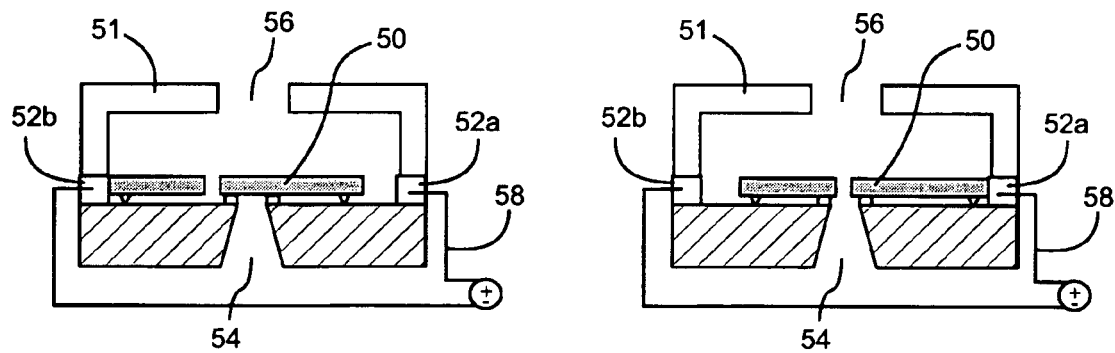
FIG. 4. Sectional view of one embodiment of a sliding, electrostatic MEMS valve (or micro valve), in a closed FIG. 4a); and a closed FIG. 4b) position which can be utilized with the present invention.

The individual valves of the present invention can be any electro-mechanical valve known to those skilled in the art for opening and closing a pneumatic pathway. Preferably, however, the valves of the present invention are MEMS valves (or micro valves). MEMS valves offer several advantages such as their low cost, low weight and ability to cycle at high frequencies. FIGS. 4a) and b) are sectional views of one embodiment of a sliding electrostatic MEMS valve (or micro valve) 51 in a closed position FIG. 4a) and an open position FIG. 4b). The actuator 50 is a sliding element operating between two electrodes 52a and 52b depending on to which the electrode voltage is applied. In FIG. 4a) voltage is being applied to electrode 52b and the slide element 50 is attracted to it closing the passage between the pneumatic pathway 54 and the individual pore 56. In this position there is no fluid flow or movement between the pneumatic pathway (or plenum) 54 and the individual pore 56. Referring now to FIG. 5b), the voltage is applied to electrode 52a. The sliding element 50 is attracted to electrode 52a thereby closing the passage between the plenum 54 and the individual pore 56 allowing movement of fluid from a high pressure area on the surface of a vehicle to a low pressure area on the surface of the vehicle. The voltage to the electrodes 52a, 52b is controlled by a controller or micro controller (not shown) through lines 58. Preferably, the valves of the present invention are capable of being cycled at frequencies of at least 1 Hz, more preferably at frequencies of at least 20 Hz, even more preferably at frequencies of at least 60 Hz, and most preferably at frequencies of at least 100 Hz. The frequencies at which the valves of the present invention are cycled may be determined based in part on a number of factors including but not limited to vehicle dynamics or environment.

The reconfigurable porosity system is preferably controlled by an electronic control system. The electronic control system of various embodiments of the present invention is preferably a controller or micro controller. The controller or micro controller can be for example a proportional-integral-derivative (PID) controller, an adaptive predictive controller, or an adaptive predictive feedback controller. In various embodiments of the present invention, the sensor transmits a signal to the controller through an electrical connection (in practical application, multiple sensors send multiple signals to the controller). The controller processes the signals to determine, through mathematical modeling, the dynamics of the flow surface. Such dynamics include boundary layer separation and stall. It is the predictive ability of the controller, which provides for this function and expands this system from being merely responsive. This is especially advantageous for dynamic systems, which are nonlinear and time varying and operating in challenging environments. The controller produces an output signal to a monitor, recorder, alarm and/or any peripheral device for alarming, monitoring, or in some manner, affecting or precluding the dynamics upon its incipience. Advantageously, the controller is the ORICA™ controller, an extended horizon, adaptive, predictive controller, produced by Orbital Research, Inc. and patented under U.S. Pat. No. 5,424,942, which is incorporated herein by reference. Under certain conditions, the controller, which is connected via electrical connection to the valve, causes the valve to open thereby resulting in fluid flow from high-pressure areas on the surface of the vehicle to low-pressure areas on the surface of the vehicle.

Figure 5:
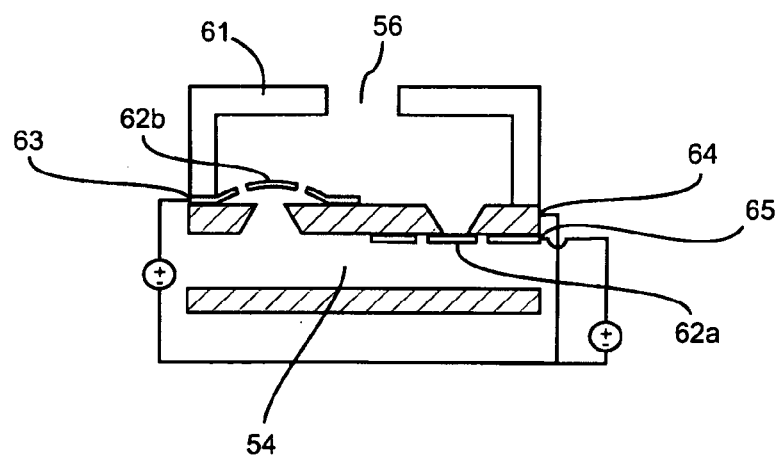
FIG. 5. Sectional view of one embodiment of an out-of-plane electrostatic MEMS valve (or micro valve), which can be utilized with the present invention.

In FIG. 5, there is shown a sectional view of one embodiment of an out-of-plane, electrostatic MEMS valve (or micro valve) 61 which can be utilized in the present invention. FIG. 5 is a detailed view of this MEMS valve 61. The MEMS valves 62a and 62b can be opened or closed, however, in this configuration they can not both be open at the same time when there is a pressure differential between the individual pore 56 and the pneumatic pathway (or plenum) 54. When the pressure is higher at the individual pore 56, the fluid flows from the individual pore 56 to the pneumatic pathway (or plenum) 54, and valve 62a can be opened. When the pressure is higher at the pneumatic pathway (or plenum) 54, the fluid flows from the pneumatic pathway (or plenum) 54 to the individual pore 56, and valve 62b can be opened. The pressure differential helps to open the valves 52a and 52b. The valves can be closed by applying a voltage to the electrodes 63, 64 and 64, 65.

Figure 6:
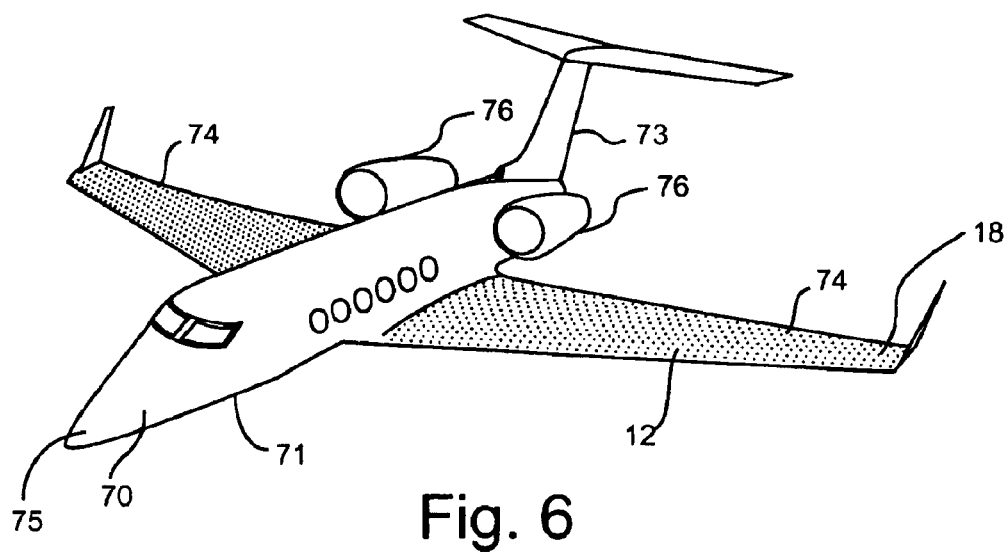
FIG. 6. Schematic view of one embodiment of an aircraft with a reconfigurable porosity system incorporated in the wings.

FIG. 6 is a schematic view of one embodiment of an aircraft 70 adapted with reconfigurable porosity system 12 incorporated in the wings 74. The aircraft for such an embodiment of the present invention can be any type of aircraft, including commercial, military and space vehicles. This reconfigurable porosity system 72 can be incorporated on many of the surfaces of the aircraft 70 including but not limited to the fuselage 71, a tail 73, forebody (nose) 75 and jet engines 76. The reconfigurable porosity system 12 comprising a porous skin further comprising a number of individual pores 18. The pores 18 capable of being opened and closed to the passage of fluid there through by individually addressable valves (not shown) corresponding and connected to the individual pores. The reconfigurable porosity system 12 being used to direct fluid from high pressure areas of the porous outer skin to low pressure areas of the porous outer skin by opening and closing the individually addressable valves (not shown).

Figure 7:
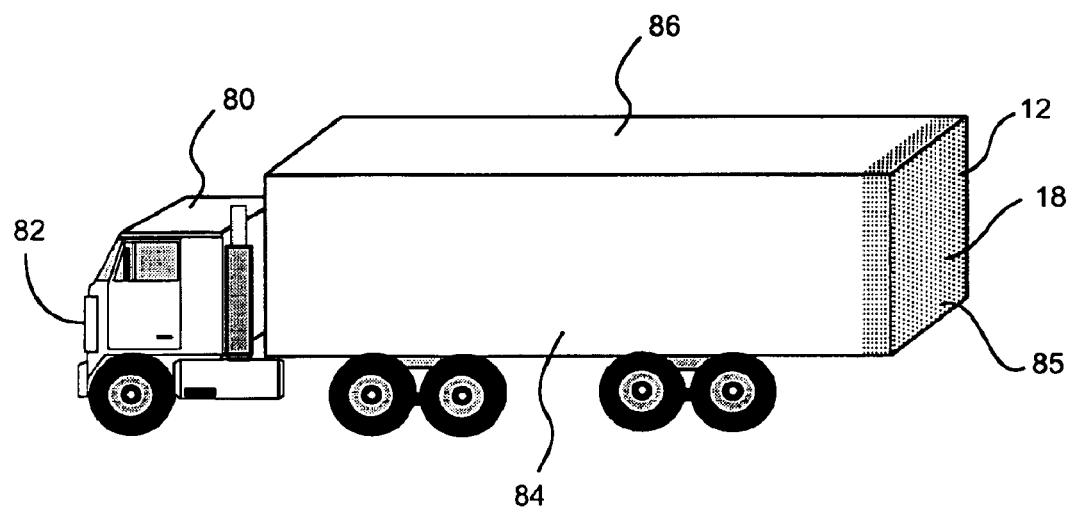
FIG. 7. Schematic view of one embodiment of a ground vehicle with a reconfigurable porosity system incorporated into its trailing surface.

FIG. 7 is a schematic view of one embodiment of a ground vehicle 80 with a reconfigurable porosity system 12 incorporated into its trailing surface. The ground vehicle for such an embodiment of the present invention can be any type of ground vehicle including commercial, personal and military. The types of ground vehicles further include but are not limited to cars, trucks, and motorcycles. This reconfigurable porosity system 12 can be incorporated on many of the surfaces of the ground vehicle 80 including but not limited to the front 82, side 84, top 80, bottom 84 and trailing 85 surfaces. The reconfigurable porosity system 12 comprising a porous skin further comprising a number of individual pores 18. The pores 18 capable of being opened and closed to the passage of fluid there through by individually addressable valves (not shown) corresponding and connected to the individual pores. The reconfigurable porosity system 12 being used to direct fluid from high pressure areas of the porous outer skin to low pressure areas of the porous outer skin by opening and closing the individually addressable valves (not shown).

The reconfigurable porosity system of the various embodiments described above and the present invention may also include a pressure or vacuum source connected to the pneumatic system to assist in fluid flow from high pressure areas of the porous outer skin to low pressure areas of the porous outer skin. The pressure and vacuum sources are described in more detail in U.S. Pat. No. 6,302,360 B1 to Ng, which is herein incorporated by reference.

One of the embodiments of the present invention includes a method for fluid flow control on the surface of an aircraft, missile, watercraft or ground vehicle comprising measuring an output of a sensor to determine conditions which result in high and low pressure areas on a porous surface comprising individual pores over which a fluid is passing; estimating or determining the high and low pressure areas of the porous surface comprising individual pores based in part on the sensor output; and opening and/or closing valves corresponding and connected to the individual pores to allow movement of the fluid from at least one of the higher pressure areas to at least one of the lower pressure areas of the porous surface through a pneumatic system connecting the pores. The method preferably includes at least one electronic control system is used to measure the output of the sensor, to estimate or determine the high and low pressure areas of the porous surface and to open and/or close valves corresponding and connected to the individual pores. The method still further preferably may include various aspects of the other embodiments described herein including but not limited to wherein the valves are opened and/or closed in a pattern, wherein the valves are individually addressable, wherein the at least one electronic control system is a closed loop controller, and wherein the valves are opened and/or closed in a pattern based on pattern recognition algorithms in the closed loop controller.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A reconfigurable porosity system for fluid flow control on the surface of an aircraft missile, watercraft or ground vehicle comprising
    a porous outer skin comprising individual pores;
    individually addressable valves corresponding and connected individual pores for opening and closing the pores;
    a pneumatic system for connecting the pores;
    a sensor having an output, the output being used at least in part to estimate or determine the high and low pressure areas of the porous outer skin,
    and a closed loop control system far opening and closing the individually addressable valves based on at least in part on the output of the sensor;
    wherein fluid from a high-pressure area of the porous outer skin can be directed to a low-pressure area of the porous outer skin by opening and closing the individually addressable valves.

2. The reconfigurable porosity system of claim 1, wherein the individually addressable valves are micro valves.

3. The reconfigurable porosity system of claim 2, wherein the micro valves are capable of operating at frequencies greater than about 1 Hz.

4. The reconfigurable porosity system of claim 2, wherein the micro valves are capable of operating at frequencies of greater than about 20 Hz.

5. The reconfigurable porosity system of claim 2, wherein the micro valves are capable of operating at frequencies of greater than about 100 Hz.

6. The reconfigurable porosity system of claim 1, further comprising a pressure or vacuum source connected to the pneumatic system to assist in fluid flow from high-pressure areas of the porous outer skin to low-pressure areas of the porous outer skin.

7. A method for fluid flow control on the surface of an aircraft, missile, watercraft or ground vehicle comprising
    measuring an output of a sensor to determine conditions which result in high and low pressure areas on a porous surface comprising individual pores over which a fluid is passing;
    estimating or determining the high and low pressure areas of the porous surface comprising individual pores based in part on the sensor output; and
    opening and/or closing valves corresponding and connected to the individual pores to allow movement of the fluid from at least one of the higher pressure areas to at least one of the lower pressure areas of the porous surface through a pneumatic system connecting the pores.

8. The method in claim 7, wherein at least one electronic control system is used to measure the output of the sensor, to estimate or determine the high and low pressure areas of the porous surface and to open and/or close valves corresponding and connected to the individual pores.

9. The method in claim 7, wherein the valves are opened and/or closed in a pattern.

10. The method in claim 7, wherein the valves are individually addressable.

11. The method in claim 7, wherein the sensor is a pressure sensor.

12. The method in claim 7, wherein the at least one electronic control system is a closed loop controller.

13. The method in claim 12, wherein the valves are opened and/or closed in a pattern based on pattern recognition algorithms in the closed loop controller.

14. The method in claim 7, wherein the valves are opened and closed at a frequency greater than about 1 Hz.

15. The method in claim 7, further comprising the step of activating a pressure or vacuum source connected to the pneumatic system to assist the fluid flow from the high pressure areas of the porous outer surface to the low pressure areas of the porous outer surface.

16. A reconfigurable porosity system for fluid flow control on the surface of an aircraft, missile, watercraft or ground vehicle comprising
    a porous outer skin comprising individual pores;
    at least one micro mechanical valve; and
    a pneumatic system for connecting the pores and valve
    wherein fluid from a high-pressure area of the porous outer skin can be directed to a low-pressure area of the porous outer skin by opening and closing the micro mechanical valve.

17. The reconfigurable porosity system of claim 16, further comprising a sensor having an output, the output being used at least in part to estimate or determine the high and low pressure areas of the porous outer skin, and a closed loop control system for opening and closing the at least one micro mechanical valve based on at least in part the output of the sensor.

18. The reconfigurable porosity system of claim 17, further comprising a pressure or vacuum source connected to the pneumatic system to assist in fluid flow from high-pressure areas of the porous outer skin to low-pressure areas of the porous outer skin.

19. The reconfigurable porosity system of claim 17, wherein the at least one micro valve is capable of operating at frequencies of greater than about 100 Hz.

* * * * *